(12) United States Patent
Hammond

(10) Patent No.: US 7,875,786 B2
(45) Date of Patent: Jan. 25, 2011

(54) INSTRUCTIONAL DEVICE AND METHOD FOR GUITAR OR OTHER STRINGED INSTRUMENT

(76) Inventor: Patrick Hammond, 7604 Elliott Dr., Raleigh, NC (US) 27613

( * ) Notice: Subject to any disclaimer, the term of this patent is extended or adjusted under 35 U.S.C. 154(b) by 1089 days.

(21) Appl. No.: 11/201,828

(22) Filed: Aug. 11, 2005

(65) Prior Publication Data

US 2007/0034070 A1 Feb. 15, 2007

(51) Int. Cl.
G09B 15/00 (2006.01)
(52) U.S. Cl. .................................................. 84/477 R
(58) Field of Classification Search ............... 84/477 R, 84/173, 485 R, 485 SR; D17/19
See application file for complete search history.

(56) References Cited

U.S. PATENT DOCUMENTS

| 727,846 | A | | 5/1903 | Sanford | |
|---|---|---|---|---|---|
| 1,821,516 | A | * | 9/1931 | Hohn | ........................ 84/485 R |
| 2,001,191 | A | | 5/1935 | Golden | |
| 2,814,231 | A | * | 11/1957 | Jones | ........................ 84/485 R |
| 3,153,970 | A | | 10/1964 | Mulchi | |
| 3,218,904 | A | | 11/1965 | Hartman | |
| 3,403,590 | A | | 10/1968 | Quinton | |
| 3,758,698 | A | | 9/1973 | Matyas | |
| 3,785,240 | A | | 1/1974 | Hill | |
| 3,978,756 | A | | 9/1976 | Feldman | |
| 4,237,765 | A | | 12/1980 | Valdez | |
| 4,289,057 | A | * | 9/1981 | Whitlock | ................. 84/485 SR |
| 4,417,197 | A | * | 11/1983 | Schwarz | ...................... 323/272 |
| 4,417,497 | A | * | 11/1983 | Nicklaus | ................... 84/485 R |
| 4,559,861 | A | | 12/1985 | Patty et al. | |
| 4,712,464 | A | | 12/1987 | Nance | |
| 4,748,890 | A | | 6/1988 | Tutaj | |
| 5,458,040 | A | | 10/1995 | Lawrence, Jr. | |
| 5,594,191 | A | | 1/1997 | Epstein et al. | |
| 5,639,977 | A | * | 6/1997 | Hesnan | ...................... 84/477 R |
| 5,920,023 | A | | 7/1999 | Ravagni et al. | |
| 6,452,080 | B1 | | 9/2002 | Coonce | |
| 6,452,081 | B1 | * | 9/2002 | Ravagni et al. | ........... 84/477 R |

* cited by examiner

*Primary Examiner*—Edwin A. Leon
*Assistant Examiner*—Vanessa Girardi
(74) *Attorney, Agent, or Firm*—Alston & Bird LLP

(57) ABSTRACT

An instructional device and method for illustrating note positions in combinations corresponding to chords formed on a musical instrument is provided. The device includes a display that defines a plurality of note positions along each of a plurality of lines. The note positions correspond to the positions along the strings of the instrument such as the fret positions along the strings of a guitar. A plurality of markers are disposed along each of the lines, and each marker is configured to adjust between the note positions along a respective one of the lines, i.e., to positions corresponding to each of the notes along the corresponding string of the instrument. The markers are structured to be adjusted to a first predetermined configuration in which indicia on the markers indicate a chordal relationship between the corresponding note positions, and relative to a select note.

7 Claims, 8 Drawing Sheets

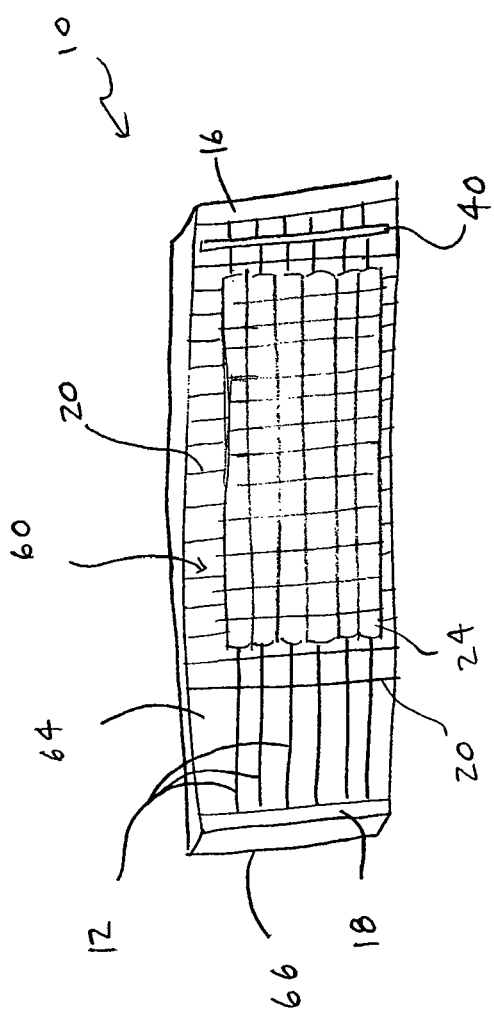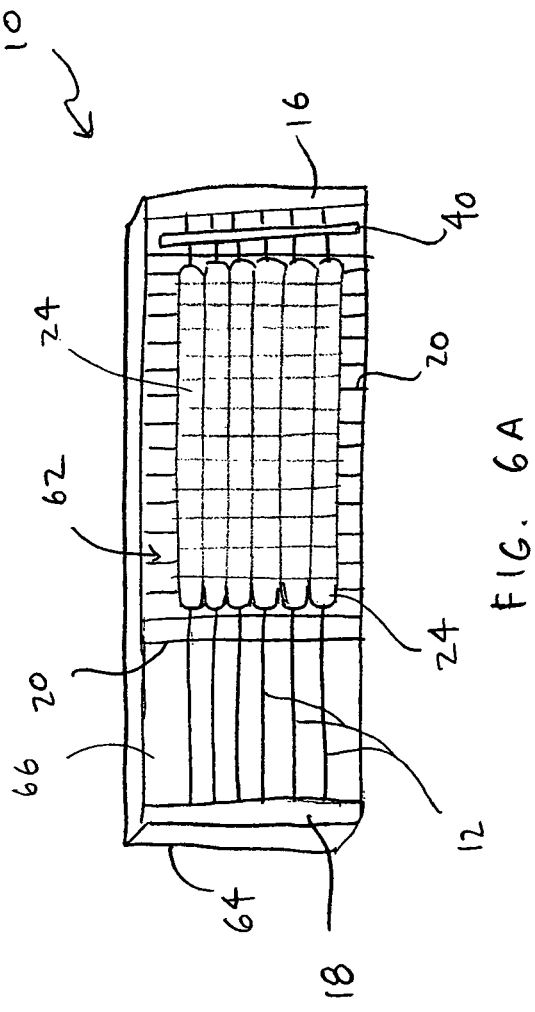

INSTRUCTIONAL DEVICE AND METHOD FOR GUITAR OR OTHER STRINGED INSTRUMENT

BACKGROUND OF THE INVENTION

1. Field of the Invention

The present invention relates to an instructional device for illustrating the positions of notes of a guitar or other stringed musical instrument, such that the device can be used for illustrating the position of, and relationship between, the notes used for forming various chords with the musical instrument.

2. Description of Related Art

A guitar typically includes five or six strings that extend over a fingerboard or neck that is disposed between a body of the instrument and a headstock. A person uses one hand to set the strings in vibration, for example, by picking, strumming, plucking, or otherwise playing the strings at the body of the instrument. The pitch of the strings is determined by the effective length and tension of the strings. Therefore, the person uses a second hand to selectively hold the strings against the fingerboard at various positions along the length of the fingerboard. The fingerboard is typically marked by frets, with each fret representing a note position, i.e., a position at which the person can hold each string against the fingerboard so that the string vibrates at the frequency of a particular note. Each successive fret generally represents the note position for a successive note on each string, each note on each string differing by a tonic interval referred to as a semitone. The formation of a chord of multiple notes typically requires that some or all of the strings are held at different frets or note positions along the fingerboard. Therefore, the person must coordinate the placement of his or her fingers on the fingerboard accordingly.

Various devices and methods have been developed for illustrating the note positions of the strings of a guitar. For example, in some cases, the guitar is provided with marks that indicate the note corresponding to each fret position along each string. That is, the strings of a 5-string guitar may be marked at the nut (i.e., the "$0^{th}$" fret) with the letters E, A, D, G, and B to indicate that the five strings should sound with the corresponding note when played in the open (unheld) position. The first fret can be marked with the letters F, A♯, D♯, G♯, and C to indicate that each string should sound with the corresponding note when the string is held at the first fret. Similarly, the other frets or note positions of the strings can be marked for each string so that the person can determine the note that can be formed with each string by holding the string at the various positions. Such marks can assist the person in learning to play the various notes of each string. However, in order to form chords of multiple notes, the person must know which notes to combine to achieve a desired chord. If the person does not know the note combinations for a desired chord, he or she must consult a reference such as an instructional book, thereby complicating the learning process.

Accordingly, there exists a need for an instructional device and an associated method for facilitating the illustration of the position of and relationship between the notes that can be formed by holding the strings of an instrument at various positions.

BRIEF SUMMARY OF THE INVENTION

The present invention provides an instructional device and method for illustrating note positions in combinations corresponding to chords formed on a musical instrument. For example, the device can be used to illustrate note positions that correspond to the notes formed by holding the strings along the frets of a guitar.

According to one embodiment of the present invention, the device includes a display that defines a plurality of note positions along each of a plurality of lines. The note positions, which correspond to the positions along the strings of the instrument, can be labeled with fixed note designations to indicate the corresponding notes of the musical instrument. In addition, markers are disposed along each of the lines. Each marker is configured to adjust between the note positions along a respective one of the lines, i.e., to positions that correspond to each of the notes along the corresponding string of the instrument. The markers are structured to be adjusted to a first predetermined configuration in which indicia on the markers indicate a chordal relationship between the corresponding note positions, e.g., using numeric indicia on the markers that indicate harmonic relationships between the corresponding notes on the musical instrument when the markers are adjusted to the first predetermined configuration. For example, the markers can be configured to be disposed in successively adjacent contact in the first predetermined configuration and/or so that the markers can be adjusted as a group to the first predetermined configuration by adjustment of one of the markers along each line. The markers can also be selectively adjusted from the first predetermined configuration so that less than all of the markers remain in the first predetermined configuration to indicate the notes positions corresponding to a select chord of the musical instrument.

According to a method of one embodiment of the present invention, a plurality of markers are provided along lines that correspond to the strings of the musical instrument so that each marker can be adjusted along one of the lines between note positions that correspond to the notes of the musical instrument. The markers are adjusted as a group to the first predetermined configuration by adjusting one of the markers along each line so that the indicia of the markers indicate a chordal relationship between the corresponding note positions of the markers. For example, one of the markers along each line can be pushed in a first direction so that all of the markers along that line are adjusted to the predetermined configuration. Thereafter, some of the markers are selectively adjusted from the first predetermined configuration so that the other markers remain in the first predetermined configuration to indicate the note positions corresponding to a select chord of the musical instrument.

Thus, the instructional device and method of the present invention can be used to facilitate the illustration of the position of, as well as the relationship between, the notes of the musical instrument, for example, as an aid in teaching a student to play the notes or chords on the instrument.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1A is a perspective view illustrating two of the markers along the first rod of the instructional device of FIG. 1;

FIG. 1B is a perspective view illustrating a tool for use with the instructional device of FIG. 1 according to another embodiment of the present invention;

FIG. 4 is a plan view schematically illustrating the markers adjusted to a first predetermined configuration relative to the note positions of the instructional device of FIG. 1;

FIG. 5 is a plan view schematically illustrating the instructional device of FIG. 4 with some of the markers selectively adjusted away from the note positions of the first predetermined configuration of FIG. 4;

FIGS. 6 and 6A are plan views illustrating opposite sides of an instructional device according to another embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
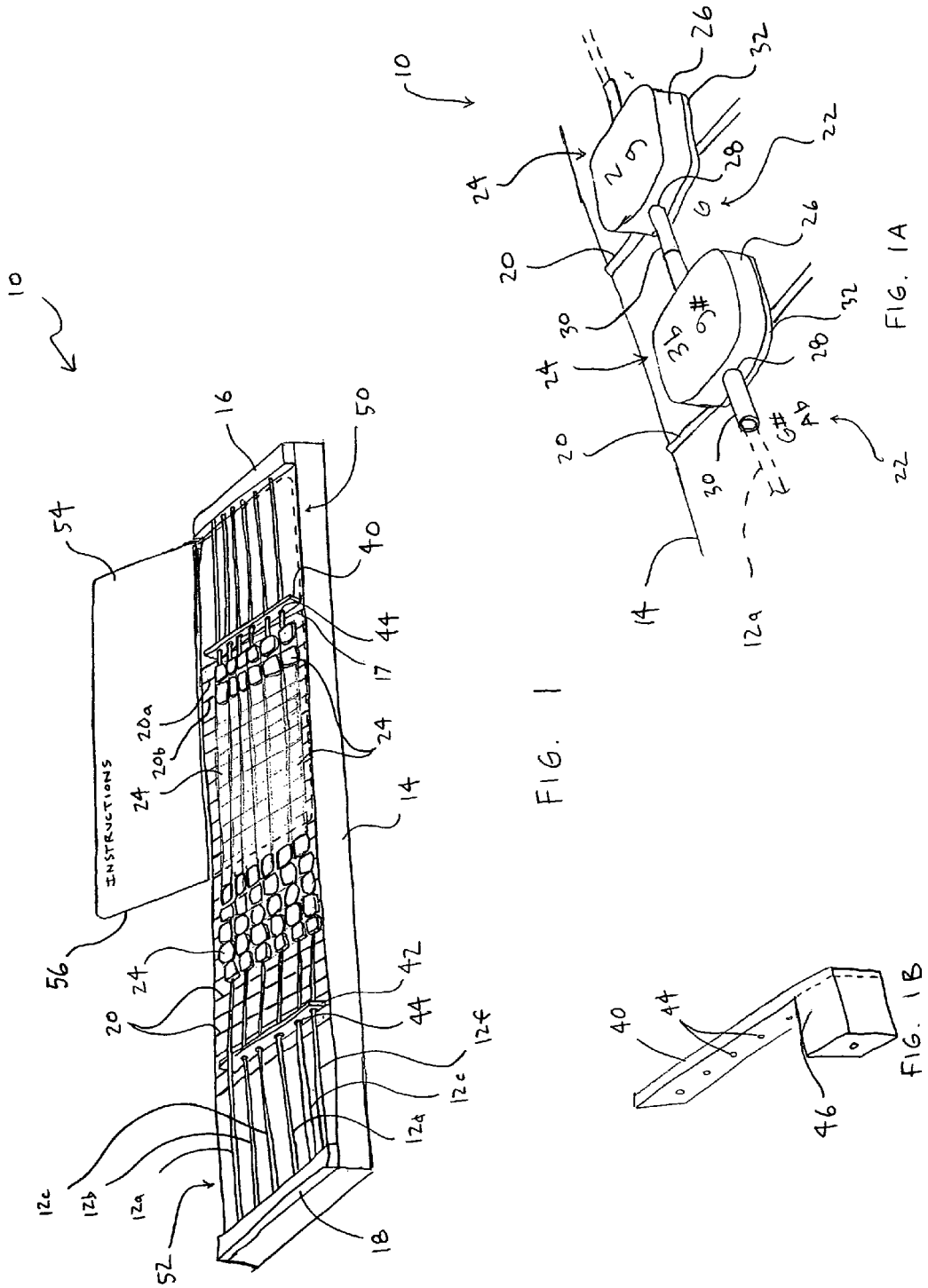
FIG. 1 is a perspective view illustrating an instructional device according to one embodiment of the present invention.

Referring now to the drawings and, in particular, to FIG. 1, there is shown a musical instructional device 10 according to one embodiment of the present invention. The instructional devices of the present invention can be used to illustrate various combinations of notes positions that correspond to the notes required for forming chords on a musical instrument. For example, the device 10 shown in FIG. 1 is generally adapted to illustrate the formation of chords on a six-string guitar. It is appreciated, however, that the device 10 shown in FIG. 1 can also be used to illustrate the positions and relationships of notes on other instruments having different numbers of strings, and devices of other embodiments of the present invention can be alternately configured to correspond to such other instruments.

As shown in FIG. 1, the instructional device 10 has six rods 12a, 12b, 12c, 12d, 12e, 12f (collectively referred to by reference numeral 12) that extend across a frame 14 between first and second support members 16, 18 of the frame 14. Each of the rods 12 is representative of a corresponding string of a six-string guitar. The device 10 can be alternatively configured, but as shown in FIG. 1, the frame 14 generally corresponds to the fingerboard or neck of the guitar and the headstock of the guitar. That is, the portion of the frame 14 between the first support member 16 and a nut 17 (or "0$^{th}$ fret") defining the headstock, and the portion of the frame 14 between the second support member 18 and the nut 17 defining the fingerboard.

Figure 2:
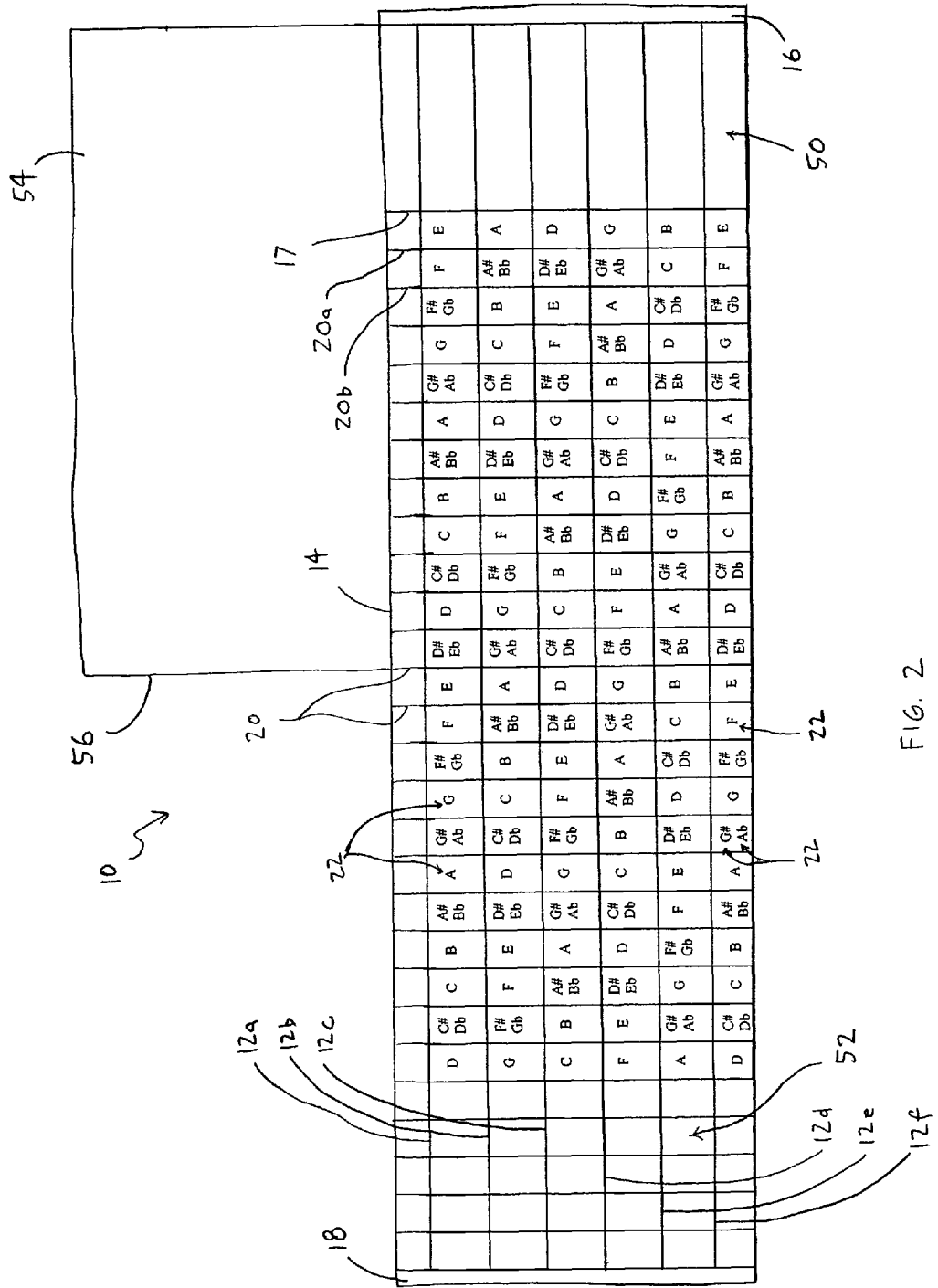
FIG. 2 is a plan view schematically illustrating the note positions of the instructional device of FIG. 1.

The frame 14 defines a plurality note positions along each rod 12. The note positions are defined by frets 20, i.e., ridges, lines, or other demarcations that extend perpendicular to the rods 12. That is, the intersection of each fret 20 with each rod 12 defines a note position that represents a note that can be formed on the guitar. In other words, each note that can be played on the guitar, i.e., by holding the string against the fingerboard at a particular fret and picking or otherwise playing the string, is represented by a corresponding one of the note positions defined by the frets 20 along each rod 12. As shown in FIGS. 1A and 2, fixed note designations 22 can be provided on the frame 14 to indicate the particular note that would be formed by holding the corresponding string at the corresponding fret of the guitar. The note positions can be considered to occur precisely at the intersection of the rods 12 and frets 20 or at the adjacent spaces defined between the frets 20.

For example, as shown in FIG. 2, the note positions at the rightmost fret 20a nearest the first support member 16 are labeled with the fixed note designations 22 symbolizing the notes E, A, D, G, B, and E. The rightmost note position on each rod 12 is the "open" position, i.e., corresponding to the note that results from playing each string of the guitar without touching the fingerboard. That is, if the fingerboard is left untouched, playing the first string will result in the note E, playing the second string will result in the note A, playing the third string will result in the note D, and so forth. Similarly, the note positions at the next rightmost fret 20b are labeled with the fixed note designations F, A♯/Bb, D♯/Eb, G♯/Ab, C, and F. Thus, e.g., if the third string of the guitar is played while holding the third string at the first fret, a D♯/Eb ("D-sharp," also termed "E-flat") will be played. The fixed note designations 22, which can be provided for some or all of the note positions, can be provided in the spaces between the frets 20, or otherwise near with the frets 20.

Returning to FIG. 1, it is shown that the device 10 also includes a plurality of markers on each of the rods 12, the markers being referred to collectively by reference numeral 24. The markers 24 are slidably connected to the rods 12 and each marker 24 typically occupies one note position along the respective rod 12. For example, as shown in FIG. 1A, each marker 24 can include a block-like body 26 that defines a bore 28 through which the respective rod 12 extends so that the marker 24 can be slidably adjustable along a line defined by the rod 12. In some cases, each marker 24 can also include a spacer 30 that provides the marker 24 with a dimension equal to the space between the frets 20. For example, each of the illustrated markers 24 includes a tube-like spacer 30 configured to receive the rod 12 therethrough. The tube-like spacer 30, which can be disposed through the bore 28 or otherwise connected to the body 26 of the marker 24, has a length that is about equal to the space between the frets along each rod 12 so that multiple markers 24 are prevented from simultaneously being disposed at each note position. That is, with one marker 24 disposed at a fret 20, the adjacent marker 24 is disposed at the adjacent fret 20 when the spacers 30 of the two markers 24 are disposed in contact.

Other types of spacers can be used, and in some cases the spacers provide the spacing function but the markers 24 are otherwise connected to the rods 12. In the case of tube-like spacers, each tube can be glued or otherwise connected to the back of the body 26 and can define a slit along its length so that the tube can be disposed on the rod 12 and removed therefrom by elastically expanding the tube and opening the slit. Alternatively, the tube-like spacers can define no slit and can be installed on the respective rods during assembly of the device 10. Further, it is appreciated that the length of each spacer 30 can correspond to one or more of the frets 20. That is, if the frets 20 are disposed at dissimilar distances, e.g., with the frets 20 being closer together near the first support member 16 and further apart near the second support member 18, the spacers 30 can also be dissimilar in length so that each marker 24 corresponds to the spaces between the frets 20 where the marker 24 is typically positioned. Typically, however, the frets 20 are evenly spaced along the length of the rods 12 and the spacers 30 therefore have similar lengths.

In some cases, the markers 24 can also be adapted to be biased in place at corresponding note positions so that a user can adjust the markers 24 to a particular position and then the markers 24 generally stay in that position until adjusted again by the user. For example, as shown in FIG. 1A, each marker 24 can include a magnet 32, and the frame 14 can be formed partially or completely of ferrous metal so that the markers 24 can slide along the rods 12, while the magnets 32 provide a sufficient magnetic attraction between the markers 24 and the frame 14 so that inadvertent movement of the markers 24 is prevented. Thus, the markers 24 can be held in place even if the device 10 is moved or tilted. Such a biasing function can also be achieved in other manners, e.g., by providing magnets on the frame 14 and forming the markers 24 of ferrous metal or by otherwise engaging the markers 24 with the frame 14, e.g., by providing corresponding protrusions and detects on the frame 14 and markers 24 so that the markers 24 engage the frame 14 at each note position.

While the markers 24 of FIG. 1 are connected to the frame 14 via the rods 12 and thereby constrained to adjust along respective lines of movement, it is appreciated that the markers 24 can be otherwise constrained to adjust along the lines of movement. For example, each of the markers 24 can define a T-shaped foot that engages one of several slots in the frame 14, each slot having a T-shaped cross-sectional shape that corresponds to the foot so that the markers 24 are constrained to adjust along the path of the respective slot. Alternatively, the frame 14 can define other structures for adjustably engaging the markers 24, such as ridges, rails, strings, or tracks on which the markers 24 can be adjusted. In any case, the markers 24 are typically configured to adjust along at least a portion of the frame 14 so that the markers 24 can be selectively positioned at the note positions for illustrating the notes and relationships between the notes of the musical instrument.

Figure 3:
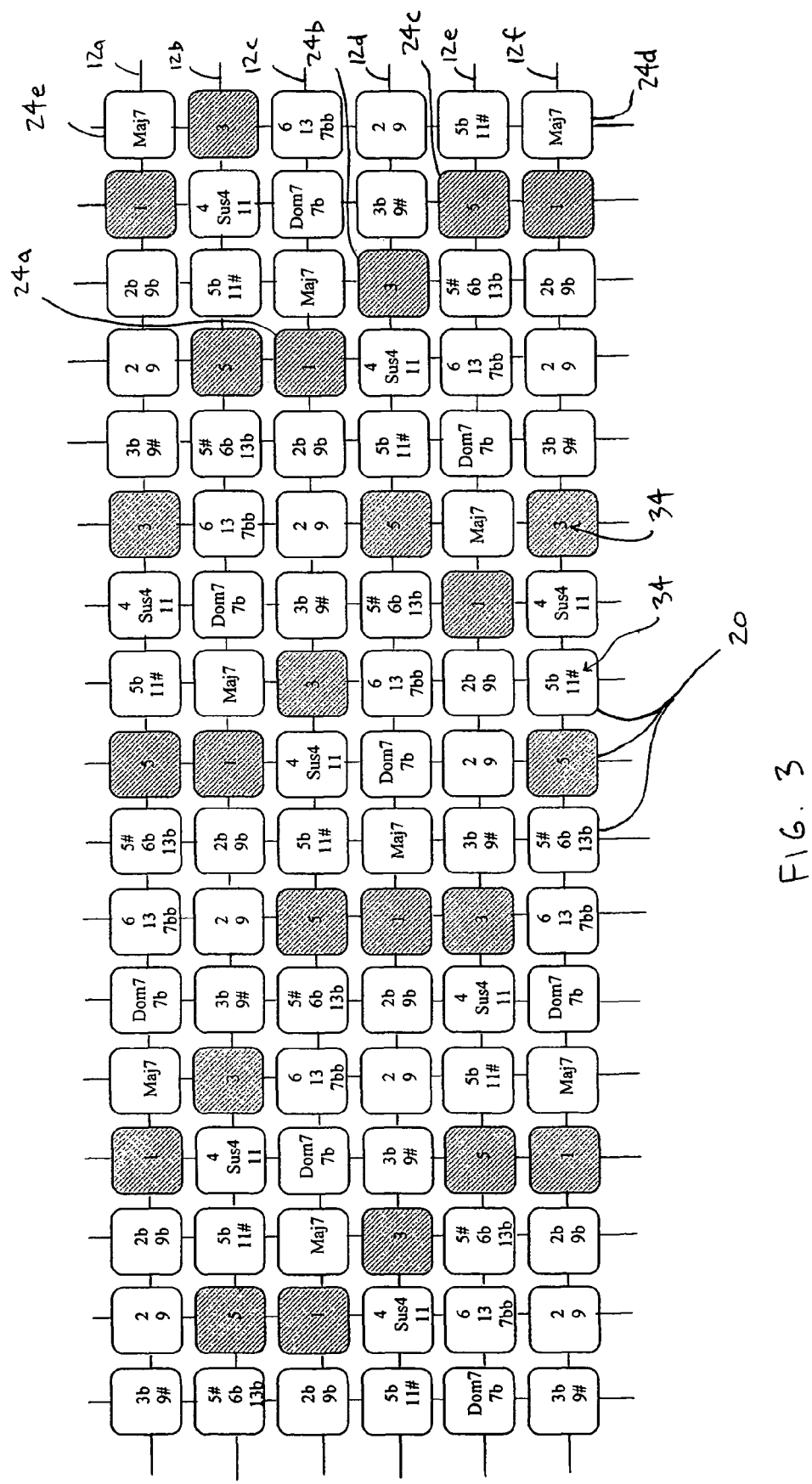
FIG. 3 is a plan view schematically illustrating the markers of the instructional device of FIG. 1.

The markers 24 are provided with indicia 34 for indicating the relationship between the various note positions and the corresponding notes of the musical instrument. In this regard, FIG. 3 illustrates the markers 24 disposed in a first predetermined configuration in which the markers 24 are disposed in adjacently contacting positions so that all of the markers 24 numerically illustrate a chordal relationship between the note positions. In this way, the relative interval between each of the note positions is indicated by the numbers indicated on the markers 24. For example, with the markers 24 adjusted to this first predetermined configuration, each of the markers 24 with a 1 thereon indicates a similar note, though the notes may differ in tone or octave. Similarly, the note positions indicated by the markers 24 with numerals 3 and 5 are representative of notes that are a tonic third and fifth, respectively, (i.e., four and seven semitones) from the note positions indicated by the markers 24 with a numeral 1. The various relationships of notes of particular chords will be understood to persons of ordinary skill in the art, and therefore no further explanation is required here.

Thus, a conventional major chord (or major triad chord) can be formed by selecting note positions indicated by markers 24 with a 1, a 3, and a 5. Similarly, numerous other chords can be formed by selecting combinations of note positions with other relationships. For example, a minor chord is represented by a 1, 3b, and 5. Seventh chords and further extended chords can be constructed by selecting the appropriate note positions as indicated by the numeric relationships identified by the markers 24. For example, a major seventh chord includes a 1, a 3, a 5, and a Maj7. A minor seventh chord includes a 1, a 3b, a 5, and a 7b. Some of the markers 24 can be provided with multiple textual indicia to indicate the multiple relationships between the respective note position and the other note positions. For example, the note position corresponding to 5♯, which is eight semitones higher than a note position marked as a 1, is also a 6b (eight semitones higher) and 13b (twenty semitones higher) relative to one of the note positions marked 1.

In addition or alternative to the textual indicia 34, some or all of the markers 24 can be provided with non-textual indicia. For example, in some cases, some of the markers 24 can be a different color than the other markers 24 to facilitate the identification or discernment of select markers 24. In particular, as illustrated in FIG. 3, the markers 24 that indicate the 1s, 3s, and 5s, i.e., the notes used in forming a major triad chord, are designated with a particular color indicated by hatching in the figure. Thus, a person can distinguish these markers 24 from the others and easily identify the position of these markers 24, and hence the notes, for forming the major triad chord.

With the markers 24 in the first predetermined configuration shown in FIG. 3, each of the markers 24 with a 1 indicates a note position that corresponds to the same note on the guitar. That is, if one or the markers 24 with a 1 is at a note position that corresponds to the note C, then each of the other markers 24 with a 1 is also at a note position that corresponds to a C note. Similarly, if the one or the markers 24 with a 1 is at a note position that corresponds to the note E, then each of the other markers 24 with a 1 is also at a note position that corresponds to an E note. Nevertheless, as noted above, the notes corresponding to note positions designated with markers 24 having the same indicia can differ in tone and can differ by one or more octaves. That is, the different strings of the guitar may result in different tones or voicing, even when each string is used to produce the same note due to the inherent characteristics of the strings. Further, the note positions indicated by markers 24 with similar numbers may differ by one or more octaves. That is, the two note positions marked with a 1 on the first rod 12a differ by one octave (with the note position nearer the second support member 18 being one full octave above the note position nearer the first support member 16). Thus, different chords can be provided by selecting combinations of note positions that are identified with the same numeric markers 24. For example, the notes corresponding to markers 24a, 24b, 24c, 24d, which include a 1, a 3, a 5, and a Maj7, will form a major seventh chord. The notes corresponding to markers 24a, 24b, 24c, 24e also include a 1, a 3, a 5, and a Maj7, but the Maj7 corresponding to marker 24e is lower in pitch than the other notes corresponding to markers 24a, 24b, 24c, thereby resulting in an inverted chord (or "inversion"). Typically, the relative pitches of notes along each rod 12 can be determined according to their positions along the rod 12, i.e., with increasingly higher pitches generally occurring closer to the second support member 18. Similarly, the relative pitches of notes on the different rods 12 can be determined according to the positions of the rods 12, i.e., with the rods 12 increasing in pitch in a direction from top to bottom as shown in FIG. 3. Thus, a person can choose the relative pitches of the notes according to the location of the note positions along the frame 14.

As shown in FIG. 3, all of the markers 24 can include the indicia 34 for indicating the relationship of the corresponding notes. Textual indicia can include the numeric indicia, as shown, which numerically indicates the relative pitch of each note vis-à-vis the pitch of each of the other notes. In particular, the indicia 34 can numerically designate successively spaced note positions, each note position representing a pitch that is spaced by a predetermined interval of one half-step or semitone from the successive note positions. Similarly, the notes formed by holding successive frets of each string of a typical guitar also differ by the same intervals, with the pitch being increasing higher in frequency for notes closer to the body and farther from the headstock. Thus, the note positions of each rod 12 also progress in a repeating pattern in a direction from the first support member 16 toward the second support member 18, each note position being increasingly higher in pitch by one semitone. That repeating pattern is shown in FIG. 3 as being indicated by the following indicia: 1, 2b/9b, 2/9, 3b/9♯, 3, 4/Sus4/11, 5b/11♯, 5, 5♯/6b/13b, 6/13/7bb, Dom7/7b, Maj7, 1. It is appreciated that other designations can be used to indicate the relationship between the notes, either numerically or otherwise.

Figure 3A:
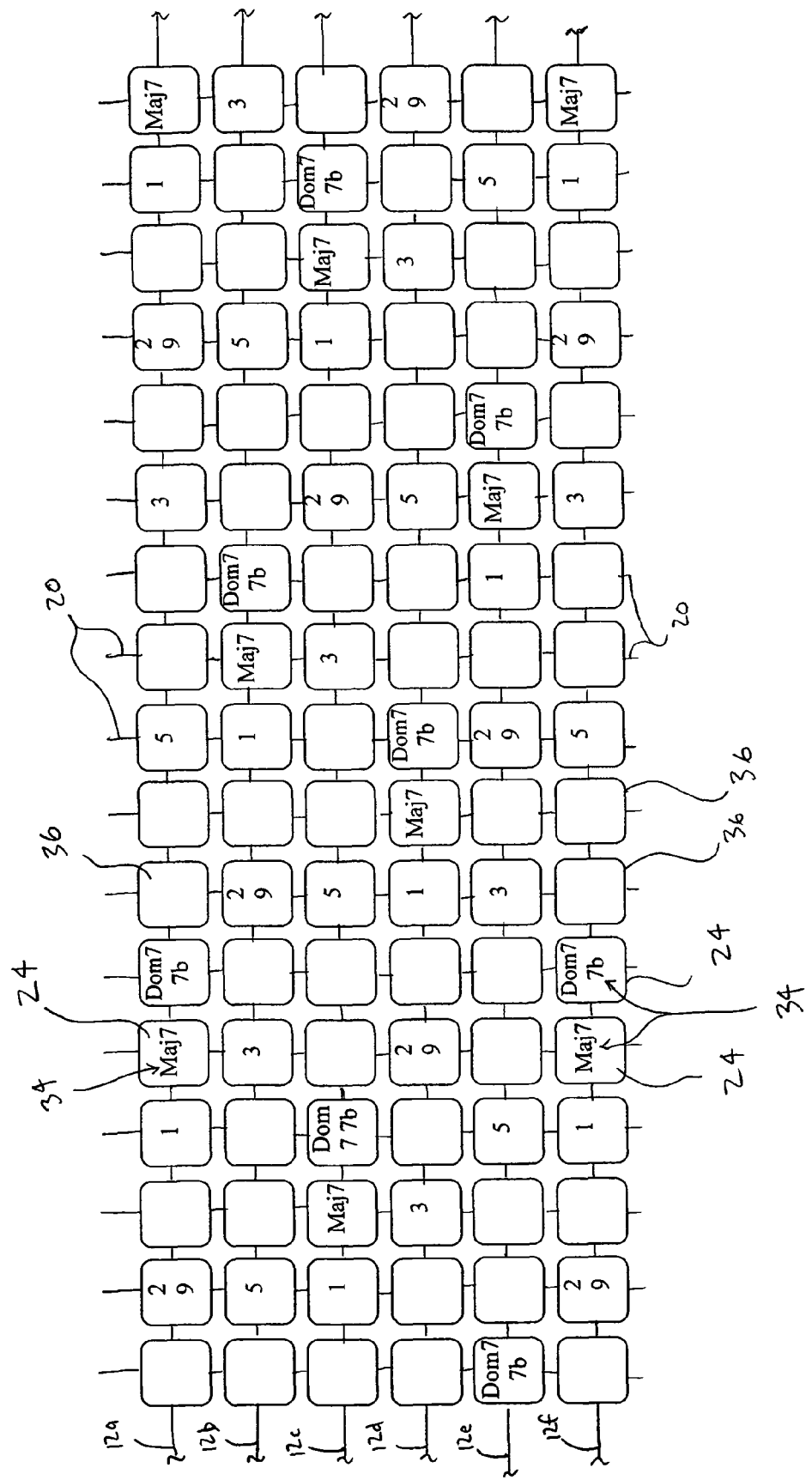
FIG. 3A is a plan view schematically illustrating the markers of an instructional device according to another embodiment of the present invention.

In some cases, it may be desirable to reduce the number of labels on the markers 24, e.g., to reduce the complexity of the device 10 for use by a beginning student. In this regard, FIG. 3A illustrates another embodiment of the present invention in which filler markers 36 are provided among the markers 24. The filler markers 36 fill the spaces between the markers 24 that have the indicia 34. The filler markers 36 lack visible indicia and therefore do not indicate the relationship of the corresponding note positions. The filler markers 36 can be formed similar to the markers 24 and left devoid of the indicia. Alternatively, the filler markers 36 can be formed by converting the markers 24, e.g., by covering the markers 24 with a cap or covering so that the indicia 34 is hidden from sight. Thus, in some cases, the markers 24 can be selectively converted to filler markers 36 and converted back to markers 24 according to the desire of the user. In addition, it is appreciated that markers 24 can be added at the left or right side of the group of markers 24 on each rod 12, or markers 24 can be omitted from the left or right side of the group of markers 24 on each rod 12. That is, in some embodiments, one or more column of markers 24 (i.e., one marker 24 on each rod 12) can be added to or omitted from the left or the right of the group of markers 24 that is shown in FIG. 3.

The markers 24 (and the filler markers 36, if present) are typically structured to be adjusted as a group to a predetermined configuration. For example, as shown in FIG. 3, a marker 24 is provided for each of the note positions along a portion of the length of each rod 12. Thus, a person can adjust one of the markers 24 on each rod 12 and thereby adjust some or all of the other markers 24 on the same rod 12 to the predetermined configuration. That is, as the marker 24 on the first rod 12a that is nearest the first support member 16 (i.e., the rightmost marker 24 on rod 12a) is adjusted in a direction toward the second support member 18, this first marker 24 contacts the second, i.e., successively next rightmost, marker 24 on the same rod 12a, the second marker 24 contacts the third marker 24 on the same rod 12a, and so forth, such that further adjustment of the first marker 24 adjusts all of the markers 24 on the first rod 12a. When adjusted to this configuration, in which all of the markers 24 on the first rod 12a are in contact, the markers 24 are disposed at intervals corresponding to the spacing between the frets 20. Similarly, some or all of the markers 24 on the other rods 12b-12f can be adjusted by adjusting a single marker 24 on those rods 12b-12f. Of course, if some or all of the markers 24 are already adjusted to positions close to one of the support members 16, 18, it may be necessary to adjust the markers 24 toward the opposite support member depending on the desired placement of the markers 24. However, even if the markers 24 are split, with some disposed in proximity to the first support member 16 and some in proximity to the second support member 18, the markers 24 can easily be adjusted toward one another so that the markers 24 on each rod 12 are successively placed in contact with one another.

Further, the markers 24 are configured to be readily positioned in the first predetermined configuration that is discussed above, i.e., a position in which the indicia 34 on the markers 24 accurately identify the relationship between the note positions. Typically, the first predetermined configuration can be achieved by simply aligning the endmost markers 24, i.e., the markers that are disposed rightmost or leftmost on each rod 12. For example, the six rightmost markers 24 on the six different rods 12, which are nearest the first support member 16, can be adjusted toward the second support member 18 to adjust the other markers 24 on the rods 12, and the six markers 24 can be stopped at a position in which the six rightmost markers 24 are aligned at a single fret 20.

As shown in FIG. 1, one or more tools 40, 42 can be provided for facilitating the adjustment of the markers 24 to the first predetermined configuration. Each tool 40, 42 can be configured to adjust in the same directions as the markers 24. For example, each tool 40, 42 can define bores 44 that corresponding to and receive the rods 12 so that each tool 40, 42 can slide along the rods 12. In this way, a person can easily slide one of the tools 40, 42 toward the markers 24 to thereby group the markers 24 and also align the markers 24 so that the markers 24 are adjusted to the first predetermined configuration in which the indicia 34 on the markers 24 accurately indicate the chordal relationship between the corresponding notes. Further, the sliding tools 40, 42 can be used to adjust the markers 24 to a desired position on the frame 14, i.e., such that the indicia 34 on the markers 24 are disposed in a desired relationship with the note positions for forming a particular chord. The tools 40, 42 can be provided at one or both sides of the markers 24.

As shown in FIG. 1, the tools 40, 42 are linear and thereby configured to adjust markers 24 on each rod 12 to the same fret 20. In other embodiments, however, each tool 40, 42 can define other shapes. For example, the first tool 40 can be replaceable or easily adaptable to a nonlinear configuration to adjust markers 24 on different rods 12 to different frets 20. In this regard, it is noted that some guitar musicians practice nontraditional tuning, such as "drop D tuning" in which the sixth string is tuned down one whole step (two semitones). Thus, when the sixth string is played in the open position, it plays a D note instead of an E note. In order to accommodate such variations in tuning, the markers 24 can be labeled or re-labeled accordingly, e.g., by reordering the sequence of markers 24 on the sixth rod 12f. Alternatively, the tool 40 can be provided with a nonlinear shape, as shown in FIG. 1B, such that a protrusion 46 on the tool 40 is configured to push the rightmost marker 24 on the sixth rod 12f two note positions to the left of the rightmost markers 24 on the other rods 12a-12e. The protrusion 46 can be a unitary portion of the tool 40, such that the tool 40 with the protrusion is substituted in place of the linear tool 40. Alternatively, the protrusion 46 can be a separate member that can be connected to and removed from the tool 40. Other variations in the configuration of the strings of the musical instrument can similarly be accommodated in this fashion.

Any number of markers 24 can be provided on the frame 14. For example, as shown in FIG. 3, seventeen markers 24 can be provided on each rod 12, i.e., a total of 102 markers 24 on the six rods 12. In other embodiments, a greater or lesser number of markers 24 can be provided. Typically, at least seven markers 24 are provided for each corresponding string of the instrument and, more typically, at least eleven markers 24 for each string, i.e., such that a complete octave is represented for each string. That is, for a 5-string guitar, the device 10 typically includes a total of at least thirty-five markers 24, and more typically, at least fifty-five markers 24. For a 6-string guitar, the device 10 typically includes a total of at least 42 markers 24 and, more typically, sixty-six markers 24. A greater number of markers 24 generally increases the usefulness of the device 10, by enabling more configurations to be demonstrated.

Similarly, the frame 14 can define any number of frets 20 and note positions, and the number of note positions can be the same as, greater than, or lesser than the number of notes that can be played on each string of the instrument. In addition, the frame 14 can include additional space for receiving the markers 24 at one or both ends. That is, as shown in FIG. 1, the device 10 includes a first area 50 proximate to the first support member 16, i.e., to the right of all of the note positions at a location corresponding to the location of the headstock of the guitar. The device 10 also includes a second area 52 proximate to the second support member 18, i.e., to the left of all of the note positions at a location corresponding to the location of the body of the guitar where the strings are played. A cover 54 can be provided for hiding one or both of the areas 50, 52 from sight. For example, as shown in FIG. 1, the cover 54 is hinged to the frame 14 so that the cover 54 can be adjusted from an open position (shown) to a closed position (shown in dashed lines). In the closed position, the cover 54 covers the first area 50 so that any markers 24 disposed in the first area 50 are disposed behind the cover 54 and hidden from sight. In other embodiments, the cover 54 can be otherwise adjustable on the frame 14. For example, the cover 54 can be slidably mounted on the frame 14, e.g., by a tongue-in-groove connection, so that the cover can be alternately adjusted in opposite directions, i.e., alternately toward the first or second support members 16, 18 of the frame 14. Thus, the cover 54 can be slid between first and second positions, such as a first (or "open") position in which the cover is disposed generally over the area 50 and a second (or "closed") position in which the cover 54 is adjusted in a direction toward the second support member 18 and thereby disposed over some of the frets 20.

The cover 54 can be large enough to cover one of the areas 52, 54 and, in some cases, the cover 54 is also configured to cover some of the frets 20. The device 10 can be used with the cover 54 in either of its positions. For example, as shown in FIG. 1, with the cover 54 in the open position, a user can easily access any of the frets 20, including those frets 20 closest to the area 50 (i.e., at the headstock). With the cover 54 open, the user can easily associate the nut 17 with the nut of the guitar, i.e., so that the first fret 20a corresponds to the first fret on the guitar, the second fret 20b corresponds to the second fret on the guitar, and so forth. Thus, the user can adjust the markers 24 to various positions and easily find the corresponding positions on the guitar. However, in some cases, the area 50 may be made relatively small to reduce the overall length of the device 10. In that case, the area 50 may not be large enough to receive all the markers 24 that are not being used to designate positions on the frets 20. For example, in the embodiment illustrated in FIGS. 1 and 3, if the user wants to align a marker 24 having a "1" with the first fret 20a on the fourth rod 12d, the ten markers 24 to the right of the "1" marker must be slid toward the first support member 16 and into the area 50. If the area 50 is not wide enough to accommodate the markers 24, the user can instead lower the cover 54, thereby covering the first twelve of the frets 20. With the first twelve frets 20 covered, the edge 56 of the cover 54 is disposed at the twelfth fret 20, i.e., one full octave higher than the nut ($0^{th}$ fret) 17. The edge 56 of the cover 54 can correspond generally in location to the edge of the headstock of the guitar so that a person viewing the device 10 with the cover 54 in the closed position can easily recognize a correlation between the frets 20 on the device with the frets on the guitar. That is, the user can easily associate the edge 56 of the cover 54 with the top of the fingerboard on the guitar, i.e., by correlating the twelfth fret 20 on the device 10 with the first nut ($0^{th}$ fret) of the guitar. Further, the user can slide unused markers 24 to the right of the twelfth fret 20 (under the cover 54), which provides a greater width of space than the area 50 alone. Instructions for using the device 10, including chord relationships or other textual indicia, can be provided on one or both sides of the cover 54.

As described above, the markers 24 can be adjusted as a group and disposed in the first predetermined configuration in which the markers 24 on each rod 12 make successive contact. Further, the markers 24 can be disposed at a select position relative to the note positions, i.e., so that all of the markers 24 with Is thereon are disposed at note positions corresponding to a particular note. Thereafter, the markers 24 can be selectively adjusted so that some of the markers 24 are moved to remote positions while some of the markers 24 remain in the first predetermined configuration. In this way, a first group of the markers 24 can be positioned to indicate the chordal relationship between the corresponding note positions, and the remaining markers 24 can be moved "out of the way" so that a person can easily examine the placement of the first group of markers 24 and refer to that placement to form a particular chord on a guitar.

For example, FIG. 4 illustrates the placement of the markers 24 in the first predetermined configuration such that the indicia 34 on the markers 24 accurately reflect the relationship between the corresponding note positions. For purposes of illustrative clarity, the markers 24 are shown in dashed lines and the indicia 34 on the markers 24 are omitted from the figure so that the fixed note designations 22 are visible. The accuracy of the indicia 34 on the markers 24 can be confirmed by reference to FIG. 3. For example, as shown in FIG. 3, each of the following two markers 24 is identified by the number 1: the marker 24 in the second column from the right, bottom row, and the marker 24 in the fourth column from the right, third row from the top. With the markers 24 in the same configuration in FIG. 4, both of the markers 24 in the same two relative positions are positioned at note positions with the fixed note designation A. In fact, all of the markers 24 indicated by the number 1 are located at note positions designated A. Further, all of the markers 24 with the same indicia 34 are positioned at notes with the same fixed note designations. Referring again to FIG. 3, it is seen that the marker 24 in the third column from the right and fourth row from the top indicates with the numeral 3, and the marker 24 in the second column from the right and fifth row from the top indicates the numeral 5. The markers 24 in these same relative positions in FIG. 4 are positioned at note positions with the fixed note designations C♯/Db and E, respectively. In fact, the notes C♯/Db and E are a diatonic third and fifth, respectively, of the note A. Thus, by positioning the markers 24 in the first predetermined configuration and adjusting the markers 24 having a 1 to the note position of A, a person can easily identify the note positions that correspond to the thirds and fifths of A according to the indicia on the markers 24. Similarly, the person can also identify note positions having any other relationship to the note A, such as a minor second (2b), major second (2), minor third (3b), major third (3), perfect fourth (4), minor fifth (5b), perfect fifth (5), augmented fifth (5♯), major sixth (6), minor seventh (7b), and major seventh (7). Each note has additional relationships to the other notes, and various relationships can be labeled for each marker 24. For example, a minor second (2b) is also a minor ninth (9b); a second (2) is also a ninth (9); a minor third (3b) is also an augmented ninth (9♯); a fourth (4) is also a suspended fourth (Sus4) and an eleventh (11); a minor fifth (5b) is also an augmented eleventh (11♯); an augmented fifth (5♯) is also a minor sixth (6b) and a minor thirteenth (13b); a sixth is also a thirteenth (13) and a diminished seventh (7bb); and a minor seventh (7b) is also a dominant seventh (Dom7).

In operation, the markers 24 can be adjusted to the first predetermined configuration and moved to a position in which the markers 24 identified with 1s are located at a select note. Then, any markers 24 with indicia 34 for notes for forming a particular chord of interest can remain in place while the other markers 24 are adjusted to the left or right. For example, FIG. 5 illustrates the markers 24 of FIG. 4 after some, but not all, of the markers 24 have been adjusted from their positions of FIG. 4. In particular, the markers 24 that identify note positions for forming particular chords based on the note A are left in place, while the other markers 24 have been adjusted to the left and right, e.g., into the first and second areas. The cover 54 has also been closed as shown in FIG. 5 so that the markers 24 in the first area 50 are hidden from view, and so that the edge 56 of the cover 54 corresponds in position to the edge of the headstock of the guitar. In this way, a person can examine the various locations of the first, third, fifth, and/or other notes such as the second/ninth or major seventh, and easily find the corresponding fret positions of a guitar.

The device 10 is configured to illustrate the relationship of every note on every fret of every string of the guitar. In this way, the device 10 can be used to illustrate the relationship between any number of notes that are part of a particular chord, such that the user can identify the relationship between any notes for a given chord, e.g., to determine how the notes of successive frets relate to any chord that is being formed. Thus, the device 10 can assist in determining smooth transitions between chords. For example, when the markers 24 are adjusted to the first predetermined configuration and the 1s are adjusted to the note positions designated E, a user can refer to the location of the 3s (G sharp) and the 5s (B) for forming an E-major chord. If the markers 24 with 3b are also left in place, the user can refer to these note positions to see what change is required to form an E-minor chord, i.e., by substituting a 3b for the 3 in the E-major chord. In addition, with the markers 24 in the same position, the user can also find the nearest note positions for forming a B chord, which includes the notes indicated by markers 24 having indicia of 5, Maj7, and 2/9 when the markers 24 are positioned with the 1s at the E note designations. Thus, with the markers 24 in a single configuration and position, the user can determine the notes for forming various chords and transitioning between the chords.

The device 10 can be used as a tool for practicing the formation of chords and a demonstration tool for illustrating the position and relationship of notes of various chords. In some cases, a user can adjust the markers 24 on the device 10 for illustrating a particular chord, and a user can then play the corresponding notes on a guitar or other instrument. Although the combinations of notes are described throughout this application as chords, the user can play the notes simultaneously or successively. In fact, the device 10 can be used to illustrate entire scales of notes, and the user can play the notes separately on the instrument.

FIGS. 6 and 6a illustrate a device 10 according to another embodiment of the present invention, in which multiple display areas 60, 62 are provided. In particular, the device 10 has first and second opposite sides 64, 66. The first display area 60 on the first side 64 includes a configuration of rods 12 and markers 24, substantially as described above in connection with FIG. 1. A second display area 62 on the second side 66 can include a modified configuration, such as the configuration of FIG. 3A, in which the filler markers 36 are used. Thus, the second display area 62 can be used to illustrate relatively simple arrangements of chords and relationships between note positions, and the first display area 60 can be used to illustrate more complex configurations. Each of the display areas can include indicia 34 on the markers 24 and fixed note designations 22 as described above, which are not shown in FIGS. 6 and 6a for purposes of illustrative clarity.

Figure 7:
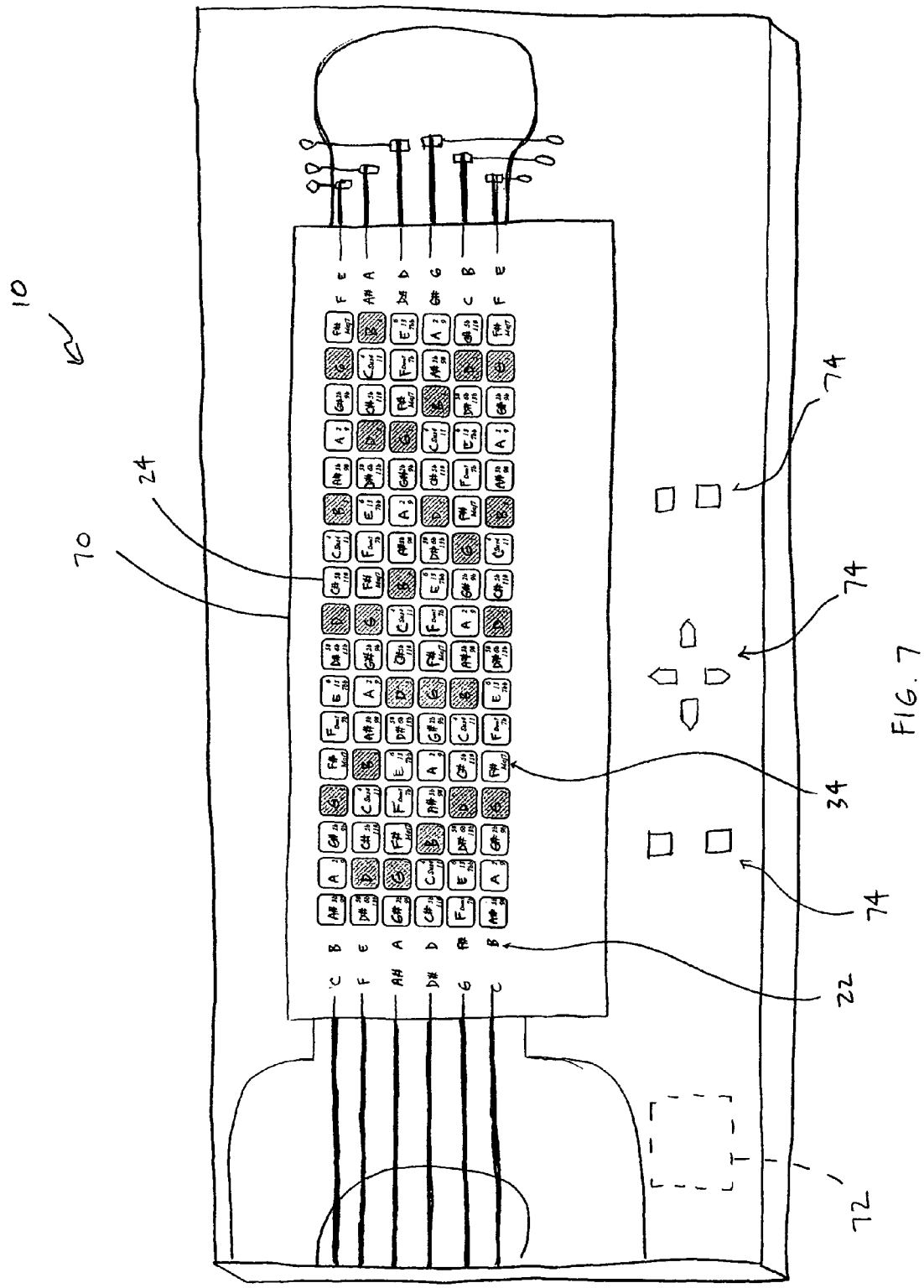
FIG. 7 is a perspective view illustrating an instructional device according to another embodiment of the present invention.

While the device 10 has been discussed above primarily as being a mechanical apparatus with tactile markers 24 that are physically adjustable by the user, the device 10 can also be configured to electronically provide a graphic display of the markers 24. In particular, as shown in FIG. 7, the device 10 can include a liquid crystal display with a display area 70 and an internal microprocessor 72 that electronically controls the display to provide a graphical representation of the fixed note designations 22 and markers 24. The device 10 can be configured to provide adjustment of the markers 24 in a manner similar to that described above. For example, the markers 24 can be displayed along lines 12 corresponding to the strings of a guitar or other instrument, and the markers 24 can be adjusted in directions parallel to the lines 12 so that a user can align those markers 24 having particular indicia 34 with particular fixed note designations 22. User input can be received by the processor 72 via an input device, such as one or more buttons 74 for controlling the adjustment of the markers 24. Thus, the user can operate the input device to adjust the position of the markers 24. As described above, the markers 24 can be provided in a first predetermined configuration, in which the markers 24 are disposed along each line 12 with no substantial gaps therebetween, i.e., such that each of the note positions along each line 12 is occupied by one of the markers 24. Further, the user can adjust the markers 24 in this predetermined configuration relative to the fixed note designations 22. Thereafter, the user can selectively designate some of the markers 24 in the predetermined configuration to identify those markers 24 as being part of a particular chord. For example, the device 10 can be configured to allow the user to designate some of the markers 24 for removal from the display area 70 so that the remaining markers 24 can be more easily discerned. Alternatively, all of the markers 24 can remain on the display area 70 while some of the markers 24 are dimmed, brightened, changed in color, or otherwise modified so that the position and configuration of the modified or unmodified markers 24 is thereby highlighted.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of illustrating combinations of note positions corresponding to chords formed of notes defined along strings of a musical instrument, the method comprising:

providing a plurality of individual markers along each of a plurality of lines corresponding to the strings of the musical instrument, each individual marker configured to adjust independently from the remaining markers along a respective one of the lines between note positions corresponding to notes of the musical instrument;

adjusting the markers as a group to a first predetermined configuration by adjusting one of the markers along each line such that indicia of the markers indicate a chordal relationship between the corresponding note positions of the markers in the first predetermined configuration; and selectively adjusting less than all of the markers along at least one of the lines from the first predetermined configuration such that some of the markers remain in the first predetermined configuration to indicate the notes positions corresponding to a select chord of the musical instrument.

2. A method according to claim 1 wherein said first adjusting step comprises adjusting a first one of the markers along a respective one of the lines to a select note position corresponding to a predetermined note such that the other markers along the respective line are adjusted to consecutively adjacent note positions, the indicia of each marker along the respective line indicating a chordal relationship to the note corresponding to the select note position.

3. A method according to claim 1 wherein said first adjusting step comprises pushing one of the markers along each line in a first direction such that the markers along each line adjust in end-to-end contact along each line to the first predetermined configuration.

4. A method according to claim 1 wherein said first adjusting step comprises adjusting the markers to fill each of the note positions along each of the lines between first and second positions along the length of the lines.

5. A method according to claim 1 wherein said adjusting steps comprise sliding the markers along at least one of the group consisting of a string, rod, rail, and slot.

6. A method according to claim 1 wherein said first adjusting step comprises adjusting a tool in the direction of the lines and thereby pushing the markers in a first direction to the first predetermined configuration.

7. A method according to claim 1 wherein said providing step comprises graphically illustrating the markers on an electronic display.

* * * * *